(No Model.)

C. B. CLARK.
STOVE PIPE DAMPER.

No. 249,303.  Patented Nov. 8, 1881.

Witnesses.
Robert Everett
J. A. Rutherford

Inventor:
Charles B. Clark.
By James L. Norris.
Atty.

UNITED STATES PATENT OFFICE.

CHARLES B. CLARK, OF DETROIT, MICHIGAN.

STOVE-PIPE DAMPER.

SPECIFICATION forming part of Letters Patent No. 249,303, dated November 8, 1881.

Application filed August 17, 1881. (No model.)

*To all whom it may concern:*

Be it known that I, CHARLES B. CLARK, a citizen of the United States, residing at Detroit, in the county of Wayne and State of Michigan, have invented new and useful Improvements in Stove-Pipe Dampers, of which the following is a specification.

The object of my invention is to produce a damper which can readily be inserted into place in the pipe, which will be so firmly held therein as to prevent its accidental displacement, and which will be held securely in any position to which it may be turned. This object I accomplish by the construction of damper, spindle, and disk or blade illustrated in the accompanying drawings, and which I will now proceed to describe.

My invention consists in providing an annular recess or seat on the spindle for its bearing in the stove-pipe, so that it will interlock with the stove-pipe, and cannot be withdrawn except by forcibly compressing its spring sides sufficiently to enable the enlargement or shoulder on the inner side of the annular recess to be drawn through the aperture in the pipe.

My invention also consists in an improved way of connecting the spindle to the disk or plate, as will hereinafter be described.

Figure 1:
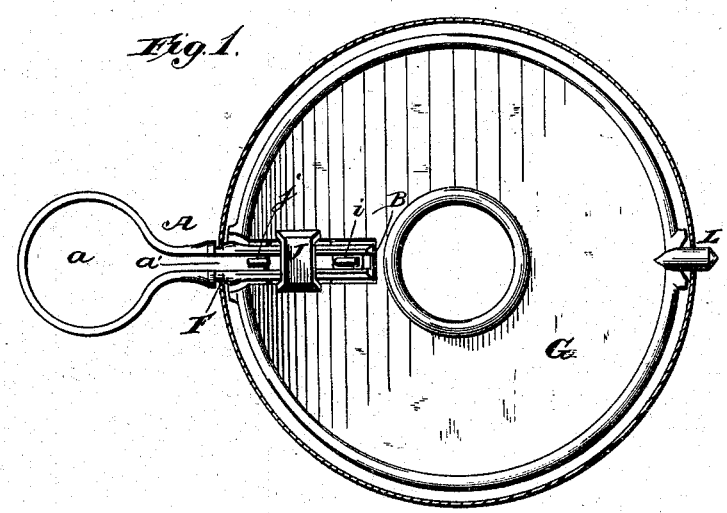
Figure 2:
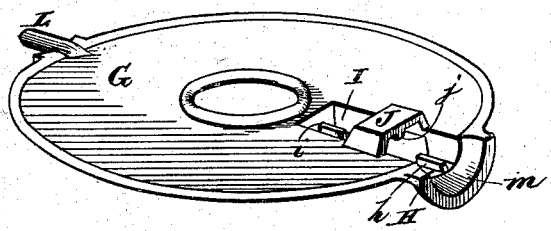
Figure 3:
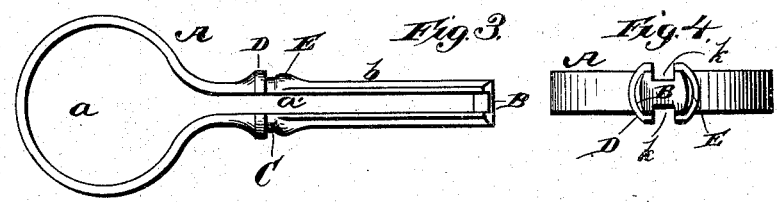
Figure 4:

In the accompanying drawings, Figure 1 is a transverse section of a stove-pipe with my improved damper in place. Fig. 2 is a detached perspective view of the damper-plate. Fig. 3 is a detached view of the spindle. Fig. 4 is an end view of the inner end of the spindle.

The spindle A is formed with an open bow, a, and slotted stem a'. The slot, however, does not extend the entire length of the stem, its end being solid at B. The spindle is made so that both sides will yield or spring in when compressed. The annular seat C for the bearing in the stove-pipe lies between the collar D and the swell or enlargement E. This seat is slightly larger in diameter than the main part of the stem b, and the aperture F in the stove-pipe is just large enough to snugly admit the end of the spindle. It is obvious that when the spindle is thrust to its place, as shown in Fig. 1, its sides will yield, in order to permit the enlargement E to pass through the aperture F in the pipe, and will then spring out against the bearing in the stove-pipe and interlock with it. The spindle, it will be seen, cannot be displaced except by a forcible withdrawal, sufficient to overcome the power of its spring and draw the enlargement E through the aperture in the pipe. This is, however, more difficult than the insertion of the spindle, because the inner side of the swell or enlargement E inclines very gently, while the side next the seat or recess is more abrupt. The expansion of the sides of the spindle against the stove-pipe causes sufficient friction to retain the damper in any position to which it may be turned, and also compensates wear and insures a continued snug fit of the spindle in its bearing.

The spindle may, of course, be otherwise constructed than above set forth. For instance, the bow may be solid and the stem may be split its entire length, as will be well understood.

The socket for the spindle in the disk or plate G is formed of the loops or straps H I on one side, and the corresponding strap J on the other side, the latter being opposite the space between the other two. These loops are provided with internal longitudinal ribs or lugs, h i j, and the end of the spindle is notched on each side at k k, so that when the spindle is thrust into the socket the lugs will pass through the notches and rest in the slot in the stem of the spindle. The spindle and disk are thus firmly and securely united. The outer end of the strap H is flared out to a half-circle, as shown at m in the drawings, in order to give the disk a suitable bearing against the side of the stove-pipe.

The damper has, of course, the usual bearing, L, on the side opposite the spindle.

By the construction above described the damper-disk can be placed in the pipe and the spindle then forced into its socket through the bearing or aperture in the pipe, the spindle will be firmly held in place, and the damper will retain any position to which it may be turned.

Heretofore a damper-spindle has been constructed of two arms disconnected at one end, but connected by means of a spring-handle at the other end, the spindle so constructed being detachably connected with the damper-disk and provided with an annular seat adjacent to the spring-handle, for closely fitting the aperture or bearing in the stove-pipe. This construction of spindle I do not therefore broadly claim; but

What I claim is—

1. The spindle A, constructed with a slotted stem and provided with a collar, D, and a swell or enlargement, E, to form an annular seat, C, for the bearing in the stove-pipe, in combination with a disk or blade, G, provided with means, as set forth, for confining the spindle in position, substantially as described.

2. The spindle A, having a spring-bow, $a$, and a longitudinal slot closed at its outer end by a solid portion, B, which is provided with a notch or notches, $k$, in combination with the disk or blade provided with the loops or straps H, I, and J, having the vertical ribs or lugs $h$, $i$, and $j$, substantially as described.

In testimony whereof I have hereunto set my hand in the presence of two subscribing witnesses.

CHARLES B. CLARK.

Witnesses:
E. J. CLARK,
JAMES ROBY.